(12) United States Patent
Nowak et al.

(10) Patent No.: US 12,455,173 B2
(45) Date of Patent: Oct. 28, 2025

(54) TRAINING MACHINE LEARNING MODELS BASED ON MOVEMENT AND TIMING DATA

(71) Applicant: Capital One Services, LLC, McLean, VA (US)

(72) Inventors: Matthew Louis Nowak, Midlothian, VA (US); Michael Anthony Young, Jr., Henrico, VA (US); Christopher McDaniel, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 323 days.

(21) Appl. No.: 18/055,665

(22) Filed: Nov. 15, 2022

(65) Prior Publication Data
US 2024/0159555 A1    May 16, 2024

(51) Int. Cl.
*G06N 20/00* (2019.01)
*G01C 21/00* (2006.01)

(52) U.S. Cl.
CPC ....... *G01C 21/383* (2020.08); *G01C 21/3856* (2020.08); *G06N 20/00* (2019.01)

(58) Field of Classification Search
CPC ............ G06N 7/01; G06N 3/084; G06N 3/09; G06N 20/00; G01C 21/383; G01C 21/3833; G01C 21/3856; G06Q 10/08; G06Q 10/087
See application file for complete search history.

(56) References Cited

U.S. PATENT DOCUMENTS

| | | | |
|---|---|---|---|
| 12,099,357 B1* | 9/2024 | Ebrahimi Afrouzi | G05D 1/0214 |
| 2020/0019778 A1* | 1/2020 | Frei | G06F 18/214 |
| 2020/0273013 A1* | 8/2020 | Garner | G06Q 20/12 |
| 2020/0298891 A1* | 9/2020 | Liang | G06N 5/04 |
| 2020/0331465 A1* | 10/2020 | Herman | G08G 1/161 |
| 2021/0004075 A1* | 1/2021 | Protter | G06N 3/08 |
| 2022/0066456 A1* | 3/2022 | Ebrahimi Afrouzi | G06F 3/04883 |
| 2023/0050825 A1* | 2/2023 | Plikynas | G06V 20/20 |
| 2023/0056327 A1* | 2/2023 | Brakob | G07G 1/0081 |
| 2023/0418281 A1* | 12/2023 | Lee | G06Q 10/06315 |

* cited by examiner

*Primary Examiner* — Navid Z. Mehdizadeh
*Assistant Examiner* — Jared C Bean
(74) *Attorney, Agent, or Firm* — Foley & Lardner LLP

(57) ABSTRACT

Systems and methods are disclosed herein for training machine learning models using precision data based on movement and timing of data collection. The system trains the machine learning model to predict object locations in an environment. The training data includes location data, timing data, and motion data, collection of which is triggered by a user input indicating that a particular object was located. The system generates precision parameters for the locations by assigning initial values to entries within the training data and may lower precision parameters based on the timing data indicating that an object was located faster than a threshold time or based on the motion data indicating that a rate of motion exceeded a threshold rate when a corresponding object was located. The system may update the training data with the lowered precision parameters and train the machine learning model to predict the object locations within the environment.

20 Claims, 10 Drawing Sheets

| User | Objects | Location Data | Timing Data | Motion Data | Accuracy Metrics |
|---|---|---|---|---|---|
| 203 | 206 | 209 | 212 | 215 | 218 |
| <user1> | <object1><br><object 3> | <user1_object1_location><br><user1_object4_location> | <user1_object1_time><br><user1_object4_time> | <user1_object1_motion><br><user1_object4_motion> | <user1_object1_AM/><br><user1_object3_AM/> |
| <user2> | <object4><br>...<br><objectn> | <user2_object4_location><br><user2_objectn_location> | <user2_object4_time><br><user2_objectn_time> | <user2_object4_motion><br><user2_objectn_motion> | <user2_object4_AM/><br>...<br><user2_objectn_AM/> |
| <user3> | <object4><br><object6><br><object8><br><object9> | <user3_object4_location><br><user3_object6_location><br><user3_object8_location><br><user3_object9_location> | <user3_object4_time><br><user3_object6_time><br><user3_object8_time><br><user3_object9_time> | <user3_object4_motion><br><user3_object6_motion><br><user3_object8_motion><br>user3_object9_motion> | <user3_object4_AM/><br><user3_object6_AM/><br><user3_object8_AM/><br><user3_object9_AM/> |
| <user4> | <object1><br><object4><br><object7> | <user4_object1_location><br><user4_object4_location><br><user4_object7_location> | <user4_object1_time><br><user4_object4_time><br><user4_object7_time> | <user4_object1_motion><br><user4_object4_motion><br><user4_object7_motion> | <user4_object1_AM/><br><user4_object4_AM/><br><user4_object7_AM/> |

| Object 4 Location | Object 6, Location | Object 7, Location | Object 8, Location |
|---|---|---|---|
| 57% | 88% | 74% | 95% |

603 — Object 4 Location
606 — Object 6, Location
609 — Object 7, Location
612 — Object 8, Location

| User | Objects | Location Data | Timing Data | Motion Data |
|---|---|---|---|---|
| <user7> | <object4><br><object6><br><object7><br><object8> | <user7_object4_location><br><user7_object6_location><br><user7_object7_location><br><user7_object8_location> | <user7_object4_time><br><user7_object6_time><br><user7_object7_time><br><user7_object8_time> | <user7_object4_motion><br><user7_object6_motion><br><user7_object7_motion><br><user7_object8_motion> |

```
┌─────────────────────────────────────────────────────────────┐
│ Receiving training data for a plurality of locations in an   │
│ environment, the training data comprising location data,     │
│ timing data, and motion data                                 │
│ 1002                                                         │
└─────────────────────────────────────────────────────────────┘
                              ↓
┌─────────────────────────────────────────────────────────────┐
│ Generating a plurality of precision parameters for the       │
│ plurality of locations                                       │
│ 1004                                                         │
└─────────────────────────────────────────────────────────────┘
                              ↓
┌─────────────────────────────────────────────────────────────┐
│ Updating the training data with lowered precision parameters │
│ 1006                                                         │
└─────────────────────────────────────────────────────────────┘
                              ↓
┌─────────────────────────────────────────────────────────────┐
│ Training, using the training data, the machine learning      │
│ model to predict the object locations within the environment │
│ 1008                                                         │
└─────────────────────────────────────────────────────────────┘
```

FIG. 10

TRAINING MACHINE LEARNING MODELS BASED ON MOVEMENT AND TIMING DATA

BACKGROUND

Machine learning model training often fails to incorporate the precision of the training data. For instance, certain entries within training data may lack precision. Currently, systems either do not assess the precision of training data or rely on manual assessment of the precision of training data, which is difficult to perform correctly. Failure to correctly determine the precision of training data before training a machine learning model with the training data decreases the reliability of the trained model. Thus, systems and methods are needed for determining the precision of data used to train machine learning models.

SUMMARY

Methods and systems are described herein for novel uses of artificial intelligence applications for training machine learning models using precision data generated based on movement and timing of data collection. It is difficult to correctly determine precision of training data, resulting in machine learning models that may be unreliable. For example, if a machine learning model is trained using location data, some of which is imprecise, a builder of the machine learning model has no way of knowing which data is precise and which data is imprecise. Conventional systems may rely on manual deletion of training entries deemed to be imprecise, but this process is cumbersome, inefficient, and prone to error.

To overcome these technical deficiencies, methods and systems disclosed herein train a machine learning model to predict object locations within an environment using precision data generated based on movement and timing of data collection. For example, the system may receive location data from users collecting objects within an environment, such as in a store. In some embodiments, the system may collect timing and motion data along with the location data. Whenever a user checks off an object from an electronic list or provides another form of input, the system may receive a location of a device associated with the user when the user entered the input, along with a time at which the user entered the input and motion data of the device at the time the user entered the input. The system may determine a precision of each location entry based on the timing data and motion data. The timing data and motion data may indicate whether user input (e.g., checking off the object) was performed at the time the user located the corresponding object or at some other time. The system may assign lower precision parameters to location entries if the system determines that the user input was performed at some time other than when the user located the object. For example, if the user located objects too quickly (e.g., based on times at which the user collected multiple objects), the system may determine that the user likely checked off multiple objects at once and may lower the precision associated with one or more of the locations. As another example, if the user was moving too quickly when performing the user input, the system may determine that the user was likely checking off the object while walking, instead of while stopping to collect the object, and may lower the precision associated with the location. The system may train the machine learning model to predict object locations within the environment using the location data and the corresponding precision data.

In particular, the system may receive training data for training a machine learning model to predict object locations in an environment. In some embodiments, the system may receive the training data from user devices associated with users. The training data may include location data, timing data, and motion data. The collection of the location data, the timing data, and the motion data may be triggered by a user input indicating that a particular object was located. The location data may include a plurality of locations, each indicating where a corresponding object was located. The timing data may include timestamps indicating a time when the corresponding object was located. The motion data may include motion measurements when the corresponding object was located.

In some embodiments, the system may generate precision parameters for the locations by assigning an initial value to each entry within the training data. The system may then lower the precision parameters based on the corresponding timing or motion data. For example, the system may determine, for a first subset of the training data, that the timing data indicates that a corresponding object was located faster than a threshold time (e.g., based on the time at which the object was located and a previous time at which a previous object was located). In response, the system may lower each precision parameter for the first subset of the training data by a first amount. The system may determine, for a second subset of the training data, that a rate of motion, indicating device velocity when the corresponding object was located, exceeds a threshold rate. In response, the system may lower each precision parameter for the second subset of the training data by a second amount. The system may update the training data with the lowered precision parameters and may train the machine learning model, using the updated training data, to predict the object locations in the environment.

In some embodiments, the system may use the trained machine learning model to predict the object locations in the environment. For example, the system may input indicators of the objects into the machine learning model to generate outputs indicating locations of the objects within the environment. The system may collect location, timing, and motion data during use of the machine learning model to update the machine learning model for increased precision.

In some embodiments, the system may output the predicted object locations in relation to a map of the environment. For example, the system may receive a map of the environment and may align the predicted locations with the map. The system may then overlap the predicted locations atop the map and output the map showing the predicted locations of objects within the environment. In some embodiments, the system may generate a route for the user to travel through the environment. For example, the system may determine a user location within the environment and may generate a route starting at the location of the user and including the locations of the objects. The system may determine instructions for navigating through the environment along the route. For example, each instruction may include a direction and a distance (e.g., "turn right then walk ten feet"). The system may overlap the route on the map showing the predicted locations of the objects and output the route, map, and a first instruction to a user device. Based on determining that the user has moved along the route, the system may output a second instruction to the user device.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a data structure that may store training data for training a machine learning model, in accordance with one or more embodiments.

FIG. 6 illustrates a data structure representing object location predictions, in accordance with one or more embodiments.

FIG. 7 illustrates a data structure for input into a machine learning model, in accordance with one or more embodiments.

FIG. 10 shows a flowchart of the process for training machine learning models using precision data generated based on movement and timing of data collection, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
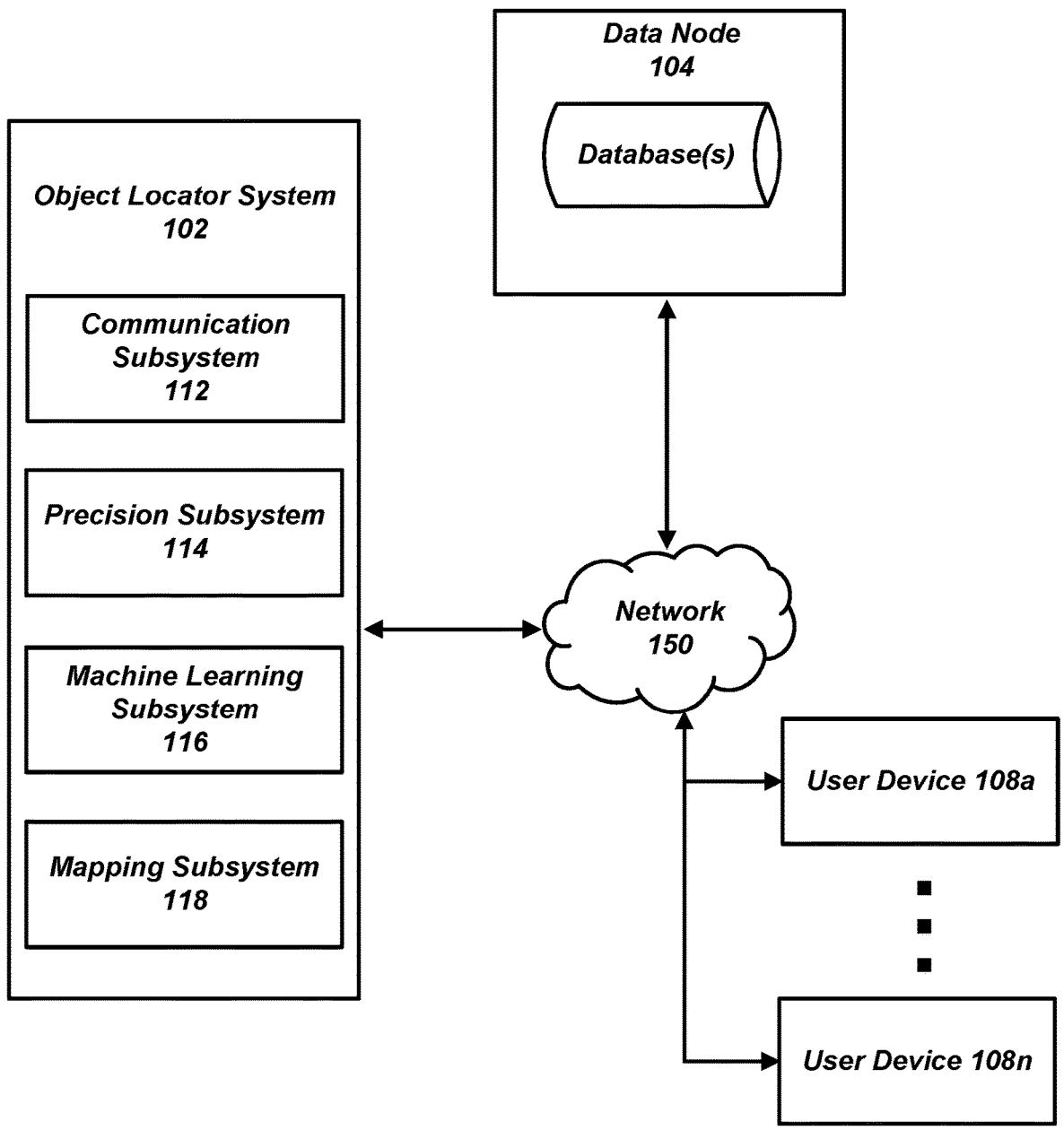
FIG. 1 shows an illustrative system for training machine learning models using precision data generated based on movement and timing of data collection, in accordance with one or more embodiments.

FIG. 1 shows an illustrative system 100 for training machine learning models using precision data generated based on movement and timing of data collection, in accordance with one or more embodiments. System 100 may include object locator system 102, data node 104, and user devices 108a-108n. Object locator system 102 may include communication subsystem 112, precision subsystem 114, machine learning subsystem 116, mapping subsystem 118, and other subsystems. In some embodiments, only one user device may be used while in other embodiments multiple user devices may be used. The user devices 108a-108n may be associated with one or more users. In some embodiments, user devices 108a-108n may be computing devices that may receive and send data via network 150. User devices 108a-108n may be end-user computing devices (e.g., desktop computers, laptops, electronic tablets, smart phones, and/or other computing devices used by end users). User devices 108a-108n may send user input (e.g., checking objects off a digital list) via network 150 and may receive and output (e.g., via a graphical user interface) object locations, maps, routes, directions, or other data received from, for example, communication sub system 112.

Object locator system 102 may execute instructions for training machine learning models using precision data generated based on movement and timing of data collection. Object locator system 102 may include software, hardware, or a combination of the two. For example, communication subsystem 112 may include a network card (e.g., a wireless network card and/or a wired network card) that is associated with software to drive the card. In some embodiments, object locator system 102 may be a physical server or a virtual server that is running on a physical computer system. In some embodiments, object locator system 102 may be configured on a user device (e.g., a laptop computer, a smart phone, a desktop computer, an electronic tablet, or another suitable user device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, object locator system 102 and data node 104 may reside on the same hardware and/or the same virtual server/computing device. Network 150 may be a local area network, a wide area network (e.g., the Internet), or a combination of the two.

Object locator system 102 (e.g., communication subsystem 112) may receive training data. For example, communication subsystem 112 may receive the training data from data node 104. In some embodiments, the training dataset may be a data structure containing training data. The training data may include location data, timing data, and motion data received from user devices (e.g., user devices 108a-108n) associated with users. For example, the location data, timing data, and motion data for a particular object may be collected at the time of user input for that object, such as when a user checks that object off a digital list. In some embodiments, a digital list may be user-generated, recommended, or created in some other way. Each user may access the list using a user device (e.g., user devices 108a-108n), via an application or otherwise. Communication subsystem 112 may receive the user input (e.g., checking an object off a list) each time a user inputs this information, along with location data, timing data, and motion data. The location data, timing data, and motion data may be received from user devices 108a-108n.

For example, the location data may be a location of a user device (e.g., user devices 108a-108n) at the time a corresponding user enters user input (e.g., checking off an object) via the user device. In some embodiments, the location data may be determined using global positioning services (GPS), which can communicate an approximate location to communication subsystem 112. Based on a GPS location of a given user device, object locator system 102 may determine in which environment (e.g., a store, mall, neighborhood, or other environment) a corresponding user is located. Communication subsystem 112 may receive more specific location information from the user device using, for example, Wi-Fi signals. For example, based on the GPS data, communication subsystem 112 may retrieve a map of the environment. In some embodiments, the map may include information about the locations of Wi-Fi routers. The user devices may detect Wi-Fi signals and determine a location of the user within the environment based on these signals. For example, object locator system 102 may use triangulation or some other method to determine a precise location of the user within the environment using the Wi-Fi signals received by the user device. In some embodiments, the environment may include beacon points. Object locator system 102 may use these signals to determine a precise location of the user within the store. In some embodiments, object locator system 102 may use sound data captured by the user devices to determine the precise location of the user within the environment. For example, the sound data captured by the user device may be used (e.g., by mapping subsystem 118) to generate a map of the environment surrounding the user. The map created using the sound data may be compared to a map of the environment (e.g., received by communication subsystem 112) to determine a location of the user within the environment. In some embodiments, object locator system 102 may use other signals to determine a location of the user within the store. In some embodiments, the location data may be in the form of coordinates, distances relative to a reference point, a numbering scheme of the environment (e.g., aisle 4B, top shelf, etc.), or some other form.

Communication subsystem 112 may receive timing data and motion data corresponding to the location data. The timing data may be the time at which a corresponding user enters the user input via a user device. For example, the user device may record timestamps corresponding to each user input (e.g., the user checking an object off a list). In some embodiments, timing data may include intervals between user inputs from a particular user. In some embodiments, the timing data may be in the form of times of day, a timer beginning at a certain point (e.g., when the user entered the environment), or some other form. The motion data may be a rate of motion of a user device at the time the corresponding user enters the user input via the user device. In some embodiments, object locator system 102 may determine the motion of the user device based on a location of the user device over time. For example, using the methods above to determine the location of the user device, the system may then determine whether the location of the user device is changing over time. Based on this determination, object locator system 102 may determine a rate of motion of the user device. In some embodiments, the user device may capture video footage while the user is within the environment and, based on the video footage, object locator system 102 may determine a rate of motion of the user. In some embodiments, motion data may include an orientation of a user device. In some embodiments, the user device may include a gyroscope, which may measure orientation and angular velocity of the user device. In some embodiments, the rate of motion may include speed, velocity, acceleration, direction, or some other form of motion. Object locator system 102 may use these measurements to determine additional information about the user device, such as orientation of the user device at the time of user input. Communication subsystem 112 may receive all location data, timing data, and motion data captured by the user devices of the users in the environment at the time of user input.

In some embodiments, object locator system 102 (e.g., precision subsystem 114) may determine precision parameters for the location data received by communication subsystem 112. For example, the precision parameters may be scores that indicate the precision of the location data received by communication subsystem 112. Precision subsystem 114 may determine the precision parameters based on timing and motion data received from the user devices (e.g., user devices 108a-108n). In some embodiments, precision subsystem 114 may set an initial precision parameter for each location (e.g., 1, 100, or some other score) and may lower precision parameters for certain locations based on the timing and motion data.

For example, precision subsystem 114 may generate, based on the timing data for each entry of the training data, a timing interval indicating an interval between when a corresponding object was located and when a next object and a previous object was located. The timing interval may indicate the time it took a user to retrieve a corresponding object after retrieving the previous object and the time it took the user to retrieve the next object after retrieving the corresponding object. Precision subsystem 114 may determine one or more timing intervals for each corresponding object. In some embodiments, precision subsystem 114 may compare the timing interval or intervals to a threshold time. For example, the threshold time may be a minimum time that would be required for the user to travel from a location of a previous object to a location of the corresponding object, from the location of the corresponding object to a location of the next object, or some other time. In some embodiments, the threshold time may be based on distances between the locations within the environment. In some embodiments, the threshold time may be based on average times required for users to travel between the objects. In some embodiments, the threshold time may be based on average time required for that specific user to travel certain distances. In some embodiments, the threshold time may be based on time of day, busyness of the environment, or other factors. Precision subsystem 114 may compare the timing interval or intervals to the threshold time. Based on determining, for a first subset of the training data, that the timing data indicates that a corresponding object was located faster than a threshold time, precision subsystem 114 may lower each precision parameter for the first subset of the training data by a first amount. In some embodiments, precision subsystem 114 may lower the precision parameters according to a discrepancy between the timing interval and the threshold time. For example, precision subsystem 114 may lower precision parameters by a larger amount for objects that were located far more quickly than the threshold time and may lower precision parameters by a smaller amount for objects that were located only slightly more quickly than the threshold time. In some embodiments, precision subsystem 114 may lower the precision parameters according to other criteria. In some embodiments, precision subsystem 114 may remove, from the first subset of the training data, the location corresponding to the object that was located faster than the threshold time.

In some embodiments, precision subsystem 114 may determine the precision parameters based on the motion data. For example, precision subsystem 114 may generate, based on the motion data for each entry of the training data, a rate of motion of the user device at the time the user entered user input. Thus, the rate of motion may indicate device velocity when the corresponding object was located. In some embodiments, precision subsystem 114 may compare the rate of motion to a threshold rate. For example, the threshold rate may be based on average rates of motion of users in the environment. In some embodiments, the threshold rate may be based on an average rate of motion for that specific user. In some embodiments, the threshold rate may be based on time of day, busyness of the environment, or other factors. Precision subsystem 114 may compare the rate of motion to the threshold rate. Based on determining, for a second subset of the training data, that the motion data indicates that the rate of motion exceeds a threshold rate, precision subsystem 114 may lower each precision parameter for the second subset of the training data by a second amount. In some embodiments, precision subsystem 114 may lower the precision parameters according to a discrepancy between the rate of motion and the threshold rate. For example, precision subsystem 114 may lower precision parameters by a larger amount for objects that were located while the rate of motion was much higher than the threshold time and may lower precision parameters by a smaller amount for objects that were located while the rate of motion was only slightly higher than the threshold time. In some embodiments, precision subsystem 114 may lower the precision parameters according to other criteria. In some embodiments, precision subsystem 114 may remove, from the second subset of the training data, the location corresponding to the object for which the rate of motion exceeded the threshold rate.

FIG. 2 illustrates a data structure 200 that may store training data for training a machine learning model, in accordance with one or more embodiments. For example, data structure 200 may include users 203, objects 206, location data 209, timing data 212, motion data 215, and precision parameters 218. As shown in data structure 200, each of the users 203 may be associated with certain objects 206. The objects 206 for each user may be objects on a list associated with the user. The list may be self-generated, automatically generated, recommended, or otherwise created by or for the user. For example, the list may be a shopping list or a list of objects purchased by the corresponding user. Each list may include one or more objects 206. Each object of objects 206 for each user may include associated location data 209, timing data 212, and motion data 215. As discussed above, the collection of the location data, the timing data, and the motion data for each object may be triggered by the corresponding user input indicating that the user located the particular object. Precision parameters 218 may represent the precision of the corresponding location data, based on the corresponding timing data and motion data. For example, precision subsystem 114 may update the training data as represented in data structure 200 to reflect lowered precision parameters based on the timing and motion data. Therefore, data structure 200 may be used to train a machine learning model once the precision parameters have been updated with the lowered precision parameters.

Returning to FIG. 1, object locator system 102 (e.g., machine learning subsystem 116) may train a machine learning model using a training dataset such as data structure 200. For example, machine learning subsystem 116 may train a machine learning model to generate outputs that indicate predicted locations of objects within the environment. Machine learning subsystem 116 may include software components, hardware components, or a combination of both. For example, machine learning subsystem 116 may include software components (e.g., API calls) that access one or more machine learning models. Machine learning subsystem 116 may access training data, for example, in memory. In some embodiments, machine learning subsystem 116 may access the training data on data node 104 or on user devices 108a-108n. In some embodiments, the training data may include the location data and corresponding timing data, motion data, and precision parameters for the objects. In some embodiments, machine learning subsystem 116 may access one or more machine learning models. For example, machine learning subsystem 116 may access the machine learning models on data node 104 or on user devices 108a-108n. In some embodiments, the machine learning models may be trained using the precision data.

Figure 3:
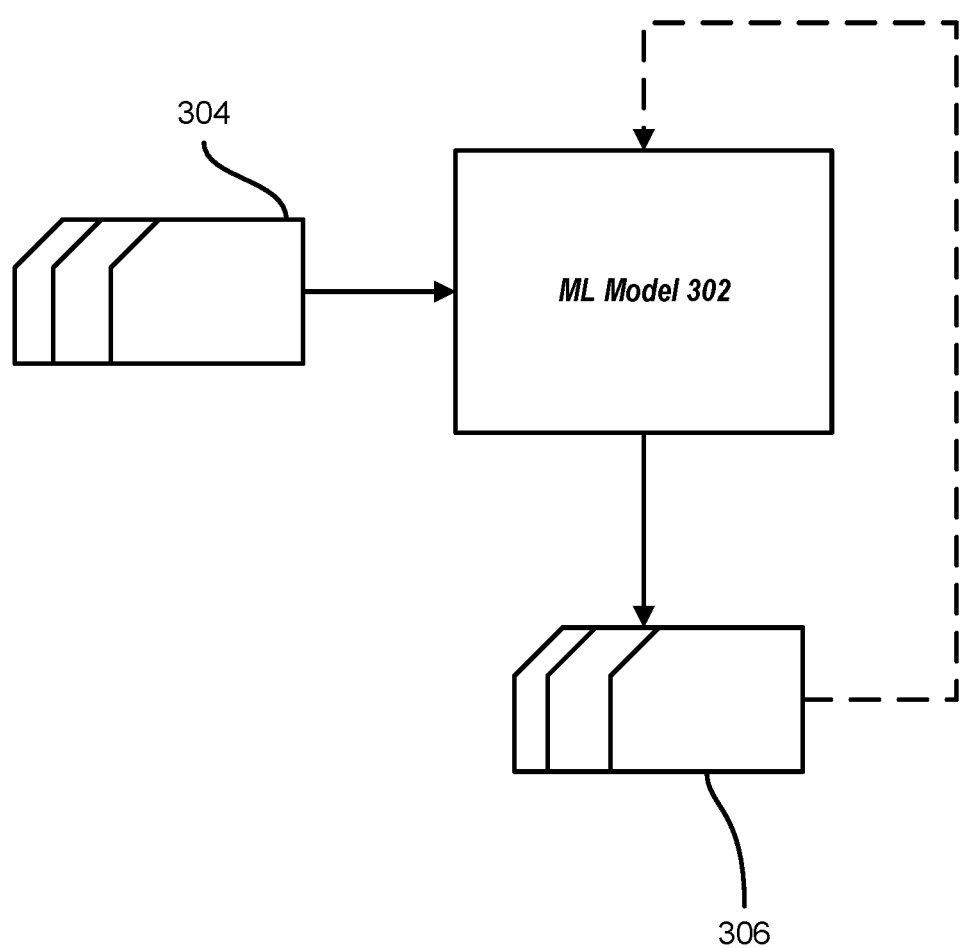
FIG. 3 illustrates an exemplary machine learning model, in accordance with one or more embodiments.

FIG. 3 illustrates an exemplary machine learning model 302, in accordance with one or more embodiments. The machine learning model may have been trained using location data and precision parameters, which are based on timing data and motion data, to predict object locations within an environment In some embodiments, machine learning model 302 may be included in machine learning subsystem 116 or may be associated with machine learning subsystem 116. Machine learning model 302 may take input 304 (e.g., location data, as described in greater detail with respect to FIG. 5) and may generate outputs 306 (e.g., object location predictions, as described in greater detail with respect to FIG. 6). The output parameters may be fed back to the machine learning model as input to train the machine learning model (e.g., alone or in conjunction with user indications of the precision of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of precision, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or a supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Figure 4:
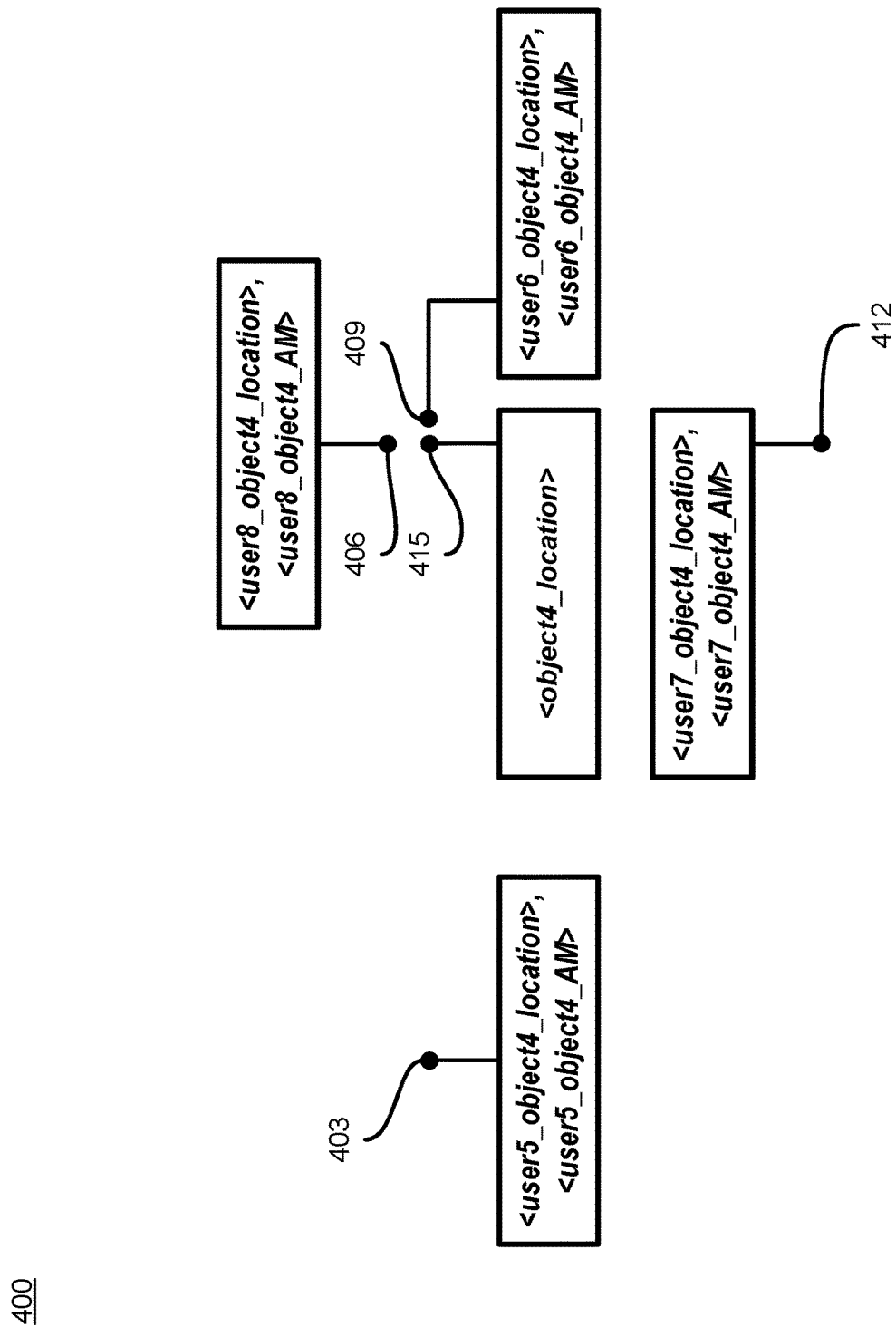
FIG. 4 illustrates training data, in accordance with one or more embodiments.

FIG. 4 illustrates training data 400, in accordance with one or more embodiments. For example, training data 400 may be used to train a machine learning model such as machine learning model 302, as shown in FIG. 3 (e.g., using machine learning subsystem 116). Each point within training data 400 may correspond to the same object (e.g., object 4) within an environment. Point 403 may be a first location received from a user device for object 4. Based on the corresponding timing and motion data, precision subsystem 114 may assign a particular precision parameter to the location of point 403. Machine learning subsystem 116 may feed the location and precision parameter of point 403 into a machine learning model as training data. Similarly, machine learning subsystem 116 may feed the location and precision parameter for each of point 406, point 409, and point 412 into the machine learning model as training data. Point 415 may represent the actual location of object 4 within the environment. As such, the precision parameters of point 406 and point 409 may be higher than the precision parameters of points 403 and 412. Machine learning subsystem 116 may, using training data such as training data 400, train a machine learning model to predict the location of objects within an environment.

Machine learning subsystem 116 may, once a machine learning model is trained, use the machine learning model to predict locations for objects within an environment. For example, machine learning subsystem 116 may receive, from a user device associated with a user, a list including a plurality of objects. For example, the list may include desired objects, recommended objects, or other objects. In some embodiments, the list may include generic descriptions (e.g., "butter"), specific descriptions (e.g., "Land O Lakes salted butter"), or other descriptions. In some embodiments, the list may include categories of objects (e.g., "ingredients for apple pie," "winter clothes," etc.). In some embodiments, the list may include request for recommendations (e.g., "movies I would like"). Machine learning subsystem 116 may generate a final list for input into the machine learning model based on user-selected objects, predicted objects based on the entries, a combination of the two, or other objects. Machine learning subsystem 116 may then input the plurality of objects into the machine learning model to generate outputs indicating locations of the plurality of objects within the indoor environment.

Figure 5:
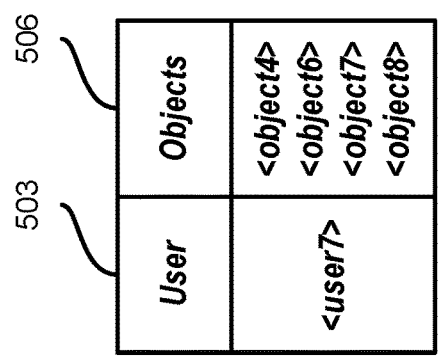
FIG. 5 illustrates a data structure for input into a machine learning model, in accordance with one or more embodiments.

FIG. 5 illustrates a data structure 500 for input into a machine learning model, in accordance with one or more embodiments. Data structure includes user 503 (e.g., user 7) and objects 506. Objects 506 may be objects entered by user 503, recommended for user 503, or otherwise selected for user 503. Machine learning subsystem 116 may input objects 506 into the trained machine learning model to generate outputs indicating a location for each of the objects 506.

FIG. 6 illustrates a data structure 600 representing object location predictions, in accordance with one or more embodiments. For example, the location predictions of data structure 600 may each correspond to the objects 506 of data structure 500, as shown in FIG. 5 (i.e., object 4, object 6, object 7, and object 8). Data structure 600 may include a location prediction for each object (e.g., prediction 603, prediction 606, prediction 609, and prediction 612). The predictions may include locations in the form of coordinates, distances relative to a reference point, a numbering scheme of the environment (e.g., aisle 4B, top shelf, etc.), or some other form. In some embodiments, the predictions may also include probabilities or confidence scores. For example, the probabilities may be output by the machine learning model based on quality of training data corresponding to the objects that were input, based on precision parameters included in the training data for locations corresponding to the objects, or based on other factors. The probabilities may be percentages, decimals, or in some other form. For example, as shown in data structure 600, the probabilities may be on a scale of zero percent to one hundred percent. Therefore, prediction 612 has the highest likelihood, while prediction 603 has the lowest likelihood. In some embodiments, data structure 600 may include multiple predictions, for example, multiple predicted locations with varying probabilities. In some embodiments, data structure 600, as shown, may display the predicted location, for each object, having the highest probability. In some embodiments, as will be discussed in further detail in relation to FIG. 8, mapping subsystem 118 may use the outputs from the machine learning model, such as the outputs shown in data structure 600, to generate maps, routes, directions, or other guidance for the user.

In some embodiments, as the user collects the objects based on the outputs from the machine learning model (e.g., data structure 600, as shown in FIG. 6), communication subsystem 112 may collect information from a user device associated with the user to improve the machine learning model. For example, the location data, timing data, and motion data for a particular object may be collected at the time of user input for that object, such as when a user checks that object off a digital list. Communication subsystem 112 may receive the user input (e.g., checking an object off a list) each time a user inputs this information, along with location data, timing data, and motion data. Machine learning subsystem 116 may update the machine learning model using the location data, timing data, and motion data received during the user's use of the machine learning model. For example, FIG. 7 illustrates a data structure 700 for input into a machine learning model, in accordance with one or more embodiments. Data structure 700 may include user 703, objects 706, location data 709, timing data 712, and motion data 715. In some embodiments, location data 709, timing data 712, and motion data 715 may be fed back into the trained machine learning model to improve the model.

Figure 8:
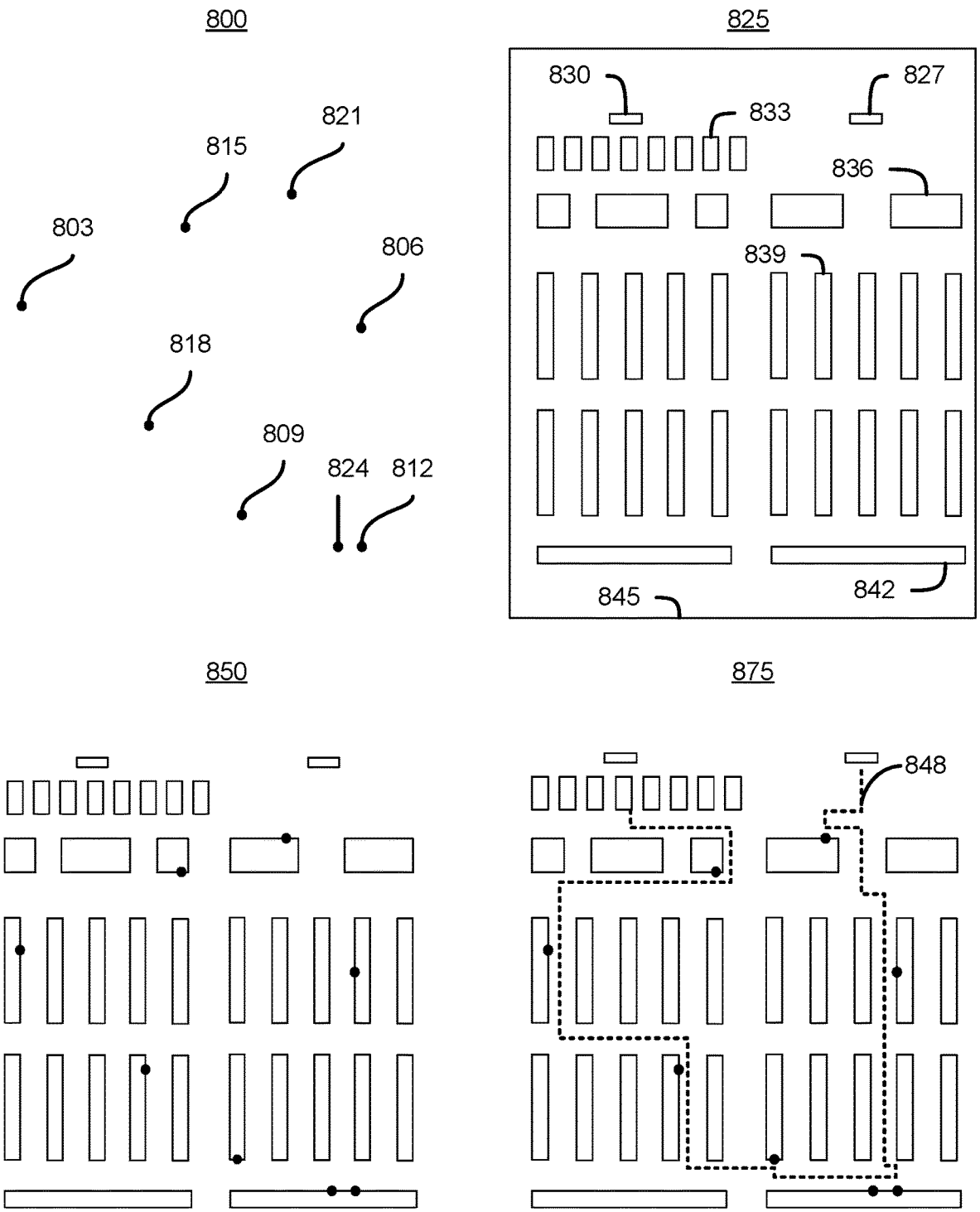
FIG. 8 illustrates object location predictions, a map of an environment, an overlayed map with the objects, and a route through the environment including the object locations, in accordance with one or more embodiments.

Returning to FIG. 1, object locator system 102 (e.g., mapping subsystem 118) may generate a map, route, directions, or other guidance for the user based on the outputs received from the trained machine learning model. FIG. 8 illustrates object location predictions 800, a map 825 of an environment, an overlayed map 850 with the objects, and an overlayed route 875 through the environment, including the object locations, in accordance with one or more embodiments. For example, object location predictions 800 may show a layout of predicted locations for objects 803-824 based on the outputs of the trained machine learning model. For example, the object location prediction 800 may show the most likely location of each prediction. In some embodiments, object locator system 102 (e.g., communication subsystem 112) may receive a two-dimensional map of the environment. For example, communication subsystem 112 may receive a store map showing a layout of the store, including aisles, sections, displays, and other features of the store. For example, the map may include an entrance 827, an exit 830, cash registers 833, produce bins 836, shelves 839, and freezers 842. In some embodiments, the map may include borders 845 indicating the edge of the store or mapping subsystem 118 may determine the borders 845 of the store.

Mapping subsystem 118 may determine a scale of the map 825 and adjust the layout of the object location predictions 800 to match the scale of the map 825. Mapping subsystem 118 may overlay the adjusted layout of the objects on the map 825 by aligning the adjusted layout of objects with the borders 845 or other features of map 825. Mapping subsystem 118 may thus generate overlayed map 850 showing the objects in relation to the features of the environment. In some embodiments, communication subsystem 112 may output, to a user device of the corresponding user, the overlayed map 850 to show the layout of the objects in relation to the map of the environment.

In some embodiments, mapping subsystem 118 may generate a route through the environment for the user. For example, mapping subsystem 118 may determine a location of the user within the environment based on a location of a user device associated with the user (e.g., received via communication subsystem 112). For example, the location of the user may be near entrance 827. Mapping subsystem 118 may then generate a route 848 starting at the location of the user. In some embodiments, mapping subsystem 118 may generate route 848 starting at another location within the environment, such as entrance 827, an area for cart pickup, or some other location mapping subsystem 118 may overlay route 848 on map 825 by aligning the locations of the objects along the route with the object location predictions 800. Route 848 may include the locations of the objects on the user's list. In some embodiments, route 848 may additionally include certain features of the environment, such as the cash registers 833 and exit 830. Route 848 may be the shortest route that connects all of the objects, may be optimized based on congestion in the environment, may include other possible locations of the objects (e.g., second most likely locations), may include recommended objects, or may be based on other criteria. In some embodiments, mapping subsystem 118 may determine instructions for navigating through the environment along route 848. In some embodiments, each instruction of the plurality of instructions may include a direction and an associated distance (e.g., "walk ten feet forward, then turn left"). In some embodiments, the instructions may include additional information about the environment (e.g., "walk ten feet forward, then turn left into aisle 10"). In some embodiments, the instructions include additional information about where to locate the objects (e.g., "the razors will be on the bottom shelf on your left").

In some embodiments, the specificity of the instructions may depend on a probability of the predicted location. For example, if the predicted location has a very high probability (e.g., 95%, such as prediction 612, as shown in FIG. 6), communication subsystem 112 may output more specific instructions than a predicted location with a lower probability (e.g., 57%, such as prediction 603, as shown in FIG. 6). In some embodiments, communication subsystem 112 may output (e.g., via a graphical user interface on the user device) functionality for the user to request more specific instructions. Communication subsystem 112 may therefore output less specific instructions initially (e.g., "the crackers are on the left side of aisle 1") and may output more specific instructions (e.g., "the crackers are on the left side of aisle 1, ten feet forward, on the top shelf") in response to a user request for more specificity. In some embodiments, for low probabilities, communication subsystem 112 may indicate a certain range or radius of the object (e.g., "the pomelo is in the citrus area of the produce section").

Communication subsystem 112 may output route 848 (e.g., via a graphical user interface on a user device associated with the user) along with a first instruction (e.g., starting at the current location of the user within the environment, at an entrance to the environment, or at another location within the environment). Based on determining that the user location has moved to a first location of a first object along the route, communication subsystem 112 may output, to the user device, a second instruction directing the user to a second object along the route, and so on.

In some embodiments, communication subsystem 112 may further output prompts or questions to the user along with the route 848. For example, when communication subsystem 112 detects that the user has arrived at a location of an object (e.g., based on a location of the user device received by communication subsystem 112), communication subsystem 112 may output a prompt to the user. For example, a prompt may include a request for the user to confirm whether the object was in the predicted location. In some embodiments, if the user indicates (e.g., via a graphical user interface of the user device) that the object was not in the predicted location, communication subsystem 112 may output a follow-up prompt, for example, requesting information about whether the object was above, below, to the left of, or to the right of the predicted location, or whether the object was either nowhere near the predicted location or not located. Machine learning subsystem 116 may use this feedback received from the user device to update the machine learning model. In some embodiments, user input received in response to any of these prompts may be recorded as the user checking the object off the list, even if the user did not check the object off the list at that time.

In some embodiments, communication subsystem 112 may output a prompt requesting input about a height (e.g., shelf height) of the object. For example, communication subsystem 112 may output a selectable interface that allows the user to select "high," "middle," or "low," or an interface that allows the user to type a height descriptor or drag and drop a slider to indicate a height of the object on the shelves. In some embodiments, communication subsystem 112 may output a request that the user scans a barcode on the object or on a shelf of the object. A user input in response to such a prompt may require that the user moves the device in a particular direction (e.g., toward the location on the shelf holding the object). Communication subsystem 112 may receive this motion data (e.g., gyroscope data from the user device indicating angular velocity) and may use the motion data to determine a height of the object on the shelves.

In some embodiments, if the user enters an input in response to any of the prompts described above, and communication subsystem 112 determines that the user is in the predicted location of the object, precision subsystem 114 may increase a precision parameter associated with the location of the object. The user engagement with object locator system 102, especially in the form of inputting detailed information or photographs of the object placement, indicates a higher likelihood that the user is at the object's location at the time they are engaging.

In some embodiments, communication subsystem 112 may output recommendations to the user device. For example, communication subsystem 112 may recommend objects to the user based on the user's list, based on the user's preferences (e.g., using the user's purchase history, a user profile, or other factors), based on brand partnerships, or based on other criteria. In some embodiments, communication subsystem 112 may output recommended objects based on the specificity of objects as entered on the user list. For example, if the user enters "coconut macaroon cookies," communication subsystem 112 may not recommend objects, whereas if the user enters "cookies," communication subsystem 112 may recommend types of cookies based on any of the above criteria.

In some embodiments, communication subsystem 112 may output information for users who do not speak the language of the environment. For example, if the objects in the environment are labeled in a language that is foreign to the user, communication subsystem 112 may output information aimed at assisting the user find the objects. In some embodiments, communication subsystem 112 may output translations of the objects on the user's list, brands or label images to look for, recommended objects, descriptions of recommended objects, and other helpful information. Communication subsystem 112 may additionally output translations of questions, in the foreign language, that the user can ask in order to gain assistance from others in the environment.

In some embodiments, machine learning subsystem 116 may constantly update the machine learning model based on new data received from users. Based on updated predictions of the updated model, mapping subsystem 118 may generate updated maps, routes, and instructions. Object locator system 102 may thus continuously evolve in response to changing locations of objects. In some embodiments, the machine learning model may additionally learn to predict trends, such as seasonal changes of objects or object placement within the environment.

Computing Environment

Figure 9:
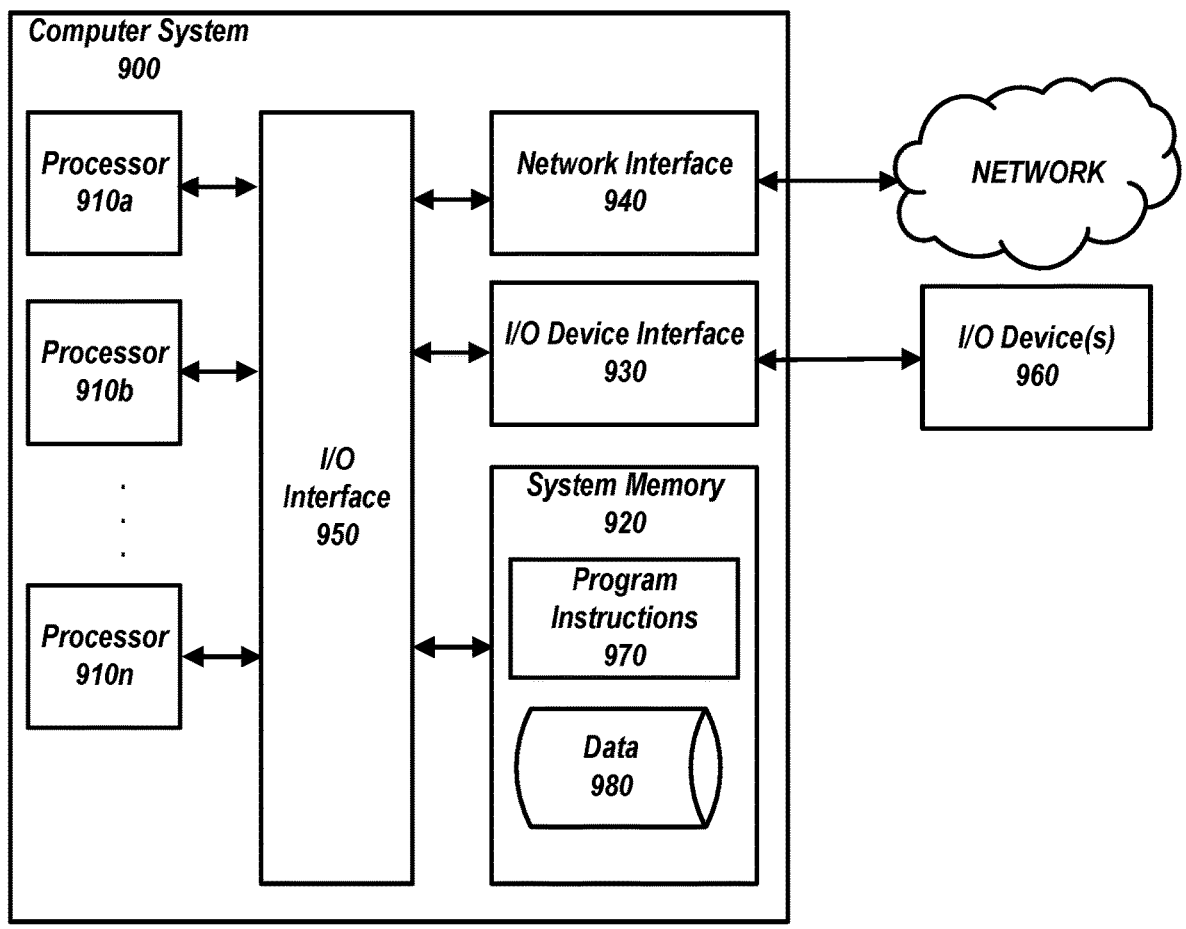
FIG. 9 illustrates a computing device, in accordance with one or more embodiments.

FIG. 9 shows an example computing system 900 that may be used in accordance with some embodiments of this disclosure. A person skilled in the art would understand that those terms may be used interchangeably. The components of FIG. 9 may be used to perform some or all operations discussed in relation to FIGS. 1-5. Furthermore, various portions of the systems and methods described herein may include or be executed on one or more computer systems similar to computing system 900. Further, processes and modules described herein may be executed by one or more processing systems similar to that of computing system 900.

Computing system 900 may include one or more processors (e.g., processors 910a-910n) coupled to system memory 920, an input/output (I/O) device interface 930, and a network interface 940 via an I/O interface 950. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 900. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 920). Computing system 900 may be a uni-processor system including one processor (e.g., processor 910a), or a multi-processor system including any number of suitable processors (e.g., 910a-910n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 900 may include a plurality of computing devices (e.g., distributed computer systems) to implement various processing functions.

I/O device interface 930 may provide an interface for connection of one or more I/O devices 960 to computing system 900. I/O devices may include devices that receive input (e.g., from a user) or output information (e.g., to a user). I/O devices 960 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 960 may be connected to computing system 900 through a wired or wireless connection. I/O devices 960 may be connected to computing system 900 from a remote location. I/O devices 960 located on remote computer systems, for example, may be connected to computing system 900 via a network and network interface 940.

Network interface 940 may include a network adapter that provides for connection of computing system 900 to a network. Network interface 940 may facilitate data exchange between computing system 900 and other devices connected to the network. Network interface 940 may support wired or wireless communication. The network may include an electronic communication network, such as the Internet, a local area network (LAN), a wide area network (WAN), a cellular communications network, or the like.

System memory 920 may be configured to store program instructions 970 or data 980. Program instructions 970 may be executable by a processor (e.g., one or more of processors 910a-910n) to implement one or more embodiments of the present techniques. Program instructions 970 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 920 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 920 may include a non-transitory computer-readable storage medium that may have program instructions stored thereon that are executable by a computer processor (e.g., one or more of processors 910a-910n) to cause the subject matter and the functional operations described herein. A memory (e.g., system memory 920) may include a single memory device and/or a plurality of memory devices (e.g., distributed memory devices).

I/O interface 950 may be configured to coordinate I/O traffic between processors 910a-910n, system memory 920, network interface 940, I/O devices 960, and/or other peripheral devices. I/O interface 950 may perform protocol, timing, or other data transformations to convert data signals from one component (e.g., system memory 920) into a format suitable for use by another component (e.g., processors 910a-910n). I/O interface 950 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 900, or multiple computing systems 900 configured to host different portions or instances of embodiments. Multiple computing systems 900 may provide for parallel or sequential processing/execution of one or more portions of the techniques described herein.

Those skilled in the art will appreciate that computing system 900 is merely illustrative, and is not intended to limit the scope of the techniques described herein. Computing system 900 may include any combination of devices or software that may perform or otherwise provide for the performance of the techniques described herein. For example, computing system 900 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computing system 900 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

FIG. 10 shows a flowchart of the process 1000 for training machine learning models using precision data generated based on movement and timing of data collection, in accordance with one or more embodiments. For example, the system may use process 1000 (e.g., as implemented on one or more system components described above) to train the machine learning model to predict object locations in an environment.

At step 1002, process 1000 (e.g., using one or more of processors 910a-910n) receives, from a plurality of user devices associated with a plurality of users, training data. The system may use the training data for training a machine learning model to predict object locations for a plurality of locations in an environment. The training data may include location data, timing data, and motion data. The collection of the location data, the timing data, and the motion data is triggered by a user input indicating that a particular object was located. In some embodiments, process 1000 may receive the training data from I/O devices 960 or elsewhere.

At step 1004, process 1000 (e.g., using one or more of processors 910a-910n) generates a plurality of precision parameters for the plurality of locations. Process 1000 may generate the precision parameters by assigning an initial value to each entry within the training data. For example, the initial precision parameters may be a value of 1, 100, or some other value. In some embodiments, process 1000 may generate the precision parameters using processors 910a-910n.

At step 1006, process 1000 (e.g., using one or more of processors 910a-910n) updates the training data with lowered precision parameters. For example, based on determining, for a first subset of the training data, that the timing data indicates that a corresponding object was located faster than a threshold time, process 1000 may lower each precision parameter for the first subset of the training data by a first amount. Based on determining, for a second subset of the training data, that a rate of motion exceeds a threshold rate when the corresponding object was located, process 1000 may lower each precision parameter for the second subset of the training data by a second amount. In some embodiments, process 1000 may update the training data using processors 910a-910n.

At step 1008, process 1000 (e.g., using one or more of processors 910a-910n) train, using the updated training data, the machine learning model to predict the object locations within the environment. In some embodiments, process 1000 may train the machine learning model using processors 910a-910n.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 10.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving, from a plurality of user devices associated with a plurality of users, training data for training a machine learning model to predict object locations for a plurality of locations in an environment, wherein the training data comprises location data, timing data, and motion data, and wherein collection of the location data, the timing data, and the motion data is triggered by a user input indicating that a particular object was located; generating a plurality of precision parameters for the plurality of locations by assigning an initial value to each entry within the training data; based on determining, for a first subset of the training data, that the timing data indicates that a corresponding object was located faster than a threshold time, lowering each precision parameter for the first subset of the training data by a first amount; based on determining, for a second subset of the training data, that a rate of motion exceeds a threshold rate when the corresponding object was located, lowering each precision parameter for the second subset of the training data by a second amount; updating the training data with lowered precision parameters; and training, using the updated training data, the machine learning model to predict the object locations within the environment.

2. The method of any one of the preceding embodiments, further comprising receiving, from a user device associated with a user, a list comprising a plurality of objects; inputting the plurality of objects into the machine learning model to generate outputs indicating locations of objects within the environment; receiving, from the user device, (1) other location data comprising another plurality of locations where the plurality of objects were located, (2) other timing data comprising another plurality of timestamps when the plurality of objects were located, and (3) other motion data comprising another plurality of motion measurements when the plurality of objects were located, and wherein collection of the other location data, the other timing data, and the other motion data is triggered by each user input, from the user, indicating that each object of the plurality of objects was located; and updating the machine learning model using the other location data, the other timing data, and the other motion data.

3. The method of any one of the preceding embodiments, wherein the outputs comprise one or more locations of each object and wherein the outputs further indicate probabilities of the locations of the objects within the environment.

4. The method of any one of the preceding embodiments, further comprising generating, based on a location having a highest probability for each object, a layout of the objects; receiving a map of the environment, wherein the map is two-dimensional; determining a scale and borders of the map of the environment; adjusting the layout of the objects to match the scale of the map; overlaying the adjusted layout of the objects on the map of the environment by aligning the adjusted layout with the borders of the map; and outputting, to the user device, the layout overlayed on the map to show the layout of the objects in relation to the map of the environment.

5. The method of any one of the preceding embodiments, further comprising determining a user location of the user within the environment; generating a route starting at the location of the user, the route comprising the locations of the objects; determining a plurality of instructions for navigating through the environment along the route, wherein each instruction of the plurality of instructions comprises a direction and an associated distance; overlaying the route on the layout overlayed on the map by aligning the locations of the objects along the route with the layout of the objects; outputting, to the user device, the route overlayed on the layout overlayed on the map and a first instruction of the plurality of instructions; and based on determining that the user location has moved to a first location of a first object along the route, outputting, to the user device, a second instruction of the plurality of instructions.

6. The method of any one of the preceding embodiments, further comprising, based on determining that the user location has moved to the first location of the first object along the route, outputting, to the user device, a plurality of selectable indicators, each indicator comprising a height, wherein the height indicates a distance in a third dimension different from either dimension of the two-dimensional map.

7. The method of any one of the preceding embodiments, further comprising receiving a selection of a selectable indicator of the plurality of selectable indicators; determining that the user location is at the first location of the first object when the selection is received; and increasing a first probability associated with the first location of the first object.

8. The method of any one of the preceding embodiments, further comprising, based on determining that the timing data indicates that another corresponding object was located faster than the threshold time, removing, from the first subset of the training data, a corresponding location of the other corresponding object.

9. A tangible, non-transitory, machine-readable medium storing instructions that, when executed by a data processing apparatus, cause the data processing apparatus to perform operations comprising those of any of embodiments 1-8.

10. A system comprising one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for map generation based on movement and timing data, the system comprising:
one or more processors; and
one or more non-transitory, computer-readable media comprising instructions that when executed by the one or more processors cause operations comprising:
receiving, from a first user device, an entry of training data for training a machine learning model to predict object locations within an indoor environment, wherein the entry of the training data comprises location data, timing data, and motion data collected based on a user input to a checklist application indicating whether a particular object has been checked off from a digital checklist at a time a user located the particular object, and wherein the location data indicates a device location of the first user device corresponding to the user input, the timing data indicates a timestamp corresponding to the user input, and the motion data indicates motion measurements of the first user device corresponding to the user input;
generating a precision parameter for the device location by assigning an initial value to the entry of the training data;
lowering the precision parameter for the device location based on the timing data and the motion data indicating that the user input was performed at some time other than the time the user located the particular object,
wherein the precision parameter is lowered by a first amount based on the timing data indicating that a timing interval between the user input and a previous or next user input being faster than a threshold time, and the precision parameter is lowered by a second amount based on the motion data indicating a rate of motion indicative of device velocity exceeding a threshold rate;
updating the training data with the precision parameter;
training, using the training data, the machine learning model to predict the object locations within the indoor environment;
receiving, from a second user device, a list comprising an object;
inputting the object into the machine learning model to generate an output indicating a location of the object within the indoor environment; and
outputting, to the second user device and using the output indicating the location of the object within the indoor environment, a map of the indoor environment showing a layout of the object.

2. The system of claim 1, wherein the list comprises a plurality of objects that include the object,
wherein inputting the object into the machine learning model comprises inputting the plurality of objects into the machine learning model to generate outputs indicating locations of the plurality of objects, and
wherein the instructions further cause the one or more processors to perform operations comprising:
receiving, from the second user device, (1) other location data comprising another plurality of locations, (2) other timing data comprising another plurality of timestamps, and (3) other motion data comprising another plurality of motion measurements; and
updating the machine learning model using the other location data, the other timing data, and the other motion data.

3. The system of claim 2, wherein the outputs comprise one or more locations of each object and wherein the outputs further indicate probabilities of the locations of the plurality of objects within the indoor environment, wherein the instructions further cause the one or more processors to perform operations comprising:
generating, based on a location having a highest probability for each object, the layout of the plurality of objects;
receiving the map of the indoor environment, wherein the map is two-dimensional;
determining a scale and borders of the map of the indoor environment;
adjusting the layout of the plurality of objects to match the scale of the map; and
overlaying the adjusted layout of the plurality of objects on the map of the indoor environment by aligning the adjusted layout with the borders of the map.

4. The system of claim 3, wherein the instructions further cause the one or more processors to perform operations comprising:
determining a user location within the indoor environment;
generating a route starting at the user location, the route comprising the locations of the plurality of objects;
determining a plurality of instructions for navigating through the indoor environment along the route, wherein each instruction of the plurality of instructions comprises a direction and an associated distance;
overlaying the route on the layout overlayed on the map by aligning the locations of the plurality of objects along the route with the layout of the plurality of objects;
outputting, to the second user device, the route overlayed on the layout overlayed on the map and a first instruction of the plurality of instructions; and
based on determining that the user location has moved to a first location of a first object along the route, outputting, to the second user device, a second instruction of the plurality of instructions.

5. A method comprising:
receiving, from a first user device, an entry of training data for training a machine learning model to predict object locations in an environment, wherein the entry of the training data comprises location data, timing data, and motion data, wherein collection of the location data, the timing data, and the motion data is triggered by a user input to an application indicating whether a particular object has been checked off from a digital list at a time a user located the particular object, and wherein the location data indicates a device location of the first user device corresponding to the user input;
generating a precision parameter for the device location by assigning an initial value to each entry within the training data;
adjusting the precision parameter for the device location based on whether the timing data and the motion data indicate that the user input was performed at some time other than the time the user located the particular object;
updating the training data with the precision parameter;

training, using the training data, the machine learning model to predict the object locations within the environment;
receiving a list comprising a plurality of objects;
inputting the plurality of objects into the machine learning model to generate outputs indicating locations of the plurality of objects within the environment; and
outputting, using the outputs indicating the locations of the plurality of objects within the environment, a map of the environment showing a layout of the plurality of objects.

6. The method of claim 5, further comprising:
receiving (1) other location data comprising another plurality of locations, (2) other timing data comprising another plurality of timestamps, and (3) other motion data comprising another plurality of motion measurements; and
updating the machine learning model using the other location data, the other timing data, and the other motion data.

7. The method of claim 5, wherein the outputs comprise one or more locations of each object and wherein the outputs further indicate probabilities of the locations of the plurality of objects within the environment.

8. The method of claim 7, further comprising:
generating, based on a location having a highest probability for each object, the layout of the plurality of objects;
receiving the map of the environment, wherein the map is two-dimensional;
determining a scale and borders of the map of the environment;
adjusting the layout of the plurality of objects to match the scale of the map; and
overlaying the adjusted layout of the plurality of objects on the map of the environment by aligning the adjusted layout with the borders of the map.

9. The method of claim 8, further comprising:
determining a user location within the environment;
generating a route starting at the user location, the route comprising the locations of the plurality of objects;
determining a plurality of instructions for navigating through the environment along the route, wherein each instruction of the plurality of instructions comprises a direction and an associated distance;
overlaying the route on the layout overlayed on the map by aligning the locations of the plurality of objects along the route with the layout of the plurality of objects;
outputting the route overlayed on the layout overlayed on the map and a first instruction of the plurality of instructions; and
based on determining that the user location has moved to a first location of a first object along the route, outputting a second instruction of the plurality of instructions.

10. The method of claim 9, further comprising, based on determining that the user location has moved to the first location of the first object along the route, outputting a plurality of selectable indicators, each indicator comprising a height, wherein the height indicates a distance in a third dimension different from either dimension of the map.

11. The method of claim 10, further comprising:
receiving a selection of a selectable indicator of the plurality of selectable indicators;
determining that the user location is at the first location of the first object when the selection is received; and
increasing a first probability associated with the first location of the first object.

12. The method of claim 5, further comprising, based on determining that the timing data indicates that another corresponding object was located faster than a threshold time, removing, from a subset of the training data, a corresponding location of the other corresponding object.

13. One or more non-transitory, computer-readable media, comprising instructions that, when executed by one or more processors, cause operations comprising:
receiving, from a first user device, an entry of training data for training a machine learning model to predict object locations in an environment, wherein the entry of the training data comprises location data, timing data, and motion data, wherein collection of the location data, the timing data, and the motion data is triggered by a user input to an application indicating whether a particular object has been checked off from a digital checklist at a time a user located the particular object, and wherein the location data indicates a device location of the first user device corresponding to the user input, the timing data indicates a timestamp corresponding to the user input, and the motion data indicates motion measurements of the first user device corresponding to the user input;
training, using the training data, the machine learning model to predict the object locations within the environment;
receiving, from a second user device, a list comprising a plurality of objects; and
outputting, to the second user device and using outputs from the machine learning model indicating locations of the plurality of objects within the environment, a map of the environment showing a layout of the plurality of objects.

14. The one or more non-transitory, computer-readable media of claim 13, wherein the instructions further cause the one or more processors to perform operations comprising:
receiving, from the second user device, (1) other location data comprising another plurality of locations, (2) other timing data comprising another plurality of timestamps, and (3) other motion data comprising another plurality of motion measurements; and
updating the machine learning model using the other location data, the other timing data, and the other motion data.

15. The one or more non-transitory, computer-readable media of claim 13, wherein the outputs comprise one or more locations of each object and wherein the outputs further indicate probabilities of the locations of the plurality of objects within the environment.

16. The one or more non-transitory, computer-readable media of claim 15, wherein the instructions further cause the one or more processors to perform operations comprising:
generating, based on a location having a highest probability for each object, the layout of the plurality of objects;
receiving the map of the environment, wherein the map is two-dimensional;
determining a scale and borders of the map of the environment;
adjusting the layout of the plurality of objects to match the scale of the map; and
overlaying the adjusted layout of the plurality of objects on the map of the environment by aligning the adjusted layout with the borders of the map.

17. The one or more non-transitory, computer-readable media of claim 16, wherein the instructions further cause the one or more processors to perform operations comprising:
  determining a user location within the environment;
  generating a route starting at the user location, the route comprising the locations of the plurality of objects;
  determining a plurality of instructions for navigating through the environment along the route, wherein each instruction of the plurality of instructions comprises a direction and an associated distance;
  overlaying the route on the layout overlayed on the map by aligning the locations of the plurality of objects along the route with the layout of the plurality of objects;
  outputting, to the second user device, the route overlayed on the layout overlayed on the map and a first instruction of the plurality of instructions; and
  based on determining that the user location has moved to a first location of a first object along the route, outputting, to the second user device, a second instruction of the plurality of instructions.

18. The one or more non-transitory, computer-readable media of claim 17, wherein the instructions further cause the one or more processors to perform operations comprising, based on determining that the user location has moved to the first location of the first object along the route, outputting, to the second user device, a plurality of selectable indicators, each indicator comprising a height, wherein the height indicates a distance in a third dimension different from either dimension of the map.

19. The one or more non-transitory, computer-readable media of claim 18, wherein the instructions further cause the one or more processors to perform operations comprising:
  receiving a selection of a selectable indicator of the plurality of selectable indicators;
  determining that the user location is at the first location of the first object when the selection is received; and
  increasing a first probability associated with the first location of the first object.

20. The one or more non-transitory, computer-readable media of claim 13, wherein the instructions further cause the one or more processors to perform operations comprising, based on determining that the timing data indicates that another corresponding object was located faster than a threshold time, removing, from a subset of the training data, a corresponding location of the other corresponding object.

\* \* \* \* \*